Figure 1:
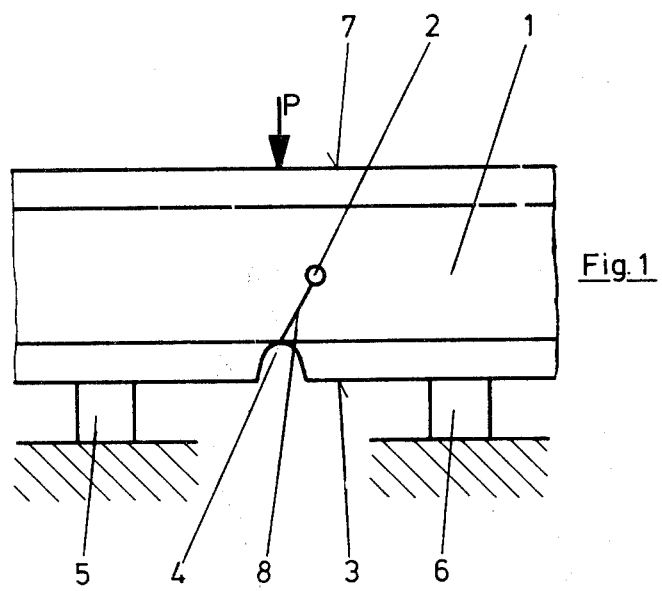

United States Patent [19]

Olschewski et al.

[11] 4,412,372

[45] Nov. 1, 1983

[54] METHOD OF MANUFACTURING BEARING RINGS RUPTURED ALONG AN ARROW-SHAPED PARTITION LINE

[75] Inventors: Armin Olschewski, Schweinfurt; Manfred Brandenstein, Eussenheim; Lothar Walter; Heinrich Kunkel, both of Schweinfurt, all of Fed. Rep. of Germany

[73] Assignee: SKF Kugellagerfabriken GmbH, Schweinfurt, Fed. Rep. of Germany

[21] Appl. No.: 209,054

[22] Filed: Nov. 21, 1980

[30] Foreign Application Priority Data

Nov. 22, 1979 [DE] Fed. Rep. of Germany ....... 2947091

[51] Int. Cl.³ ...................... B21D 53/10; B23P 17/00
[52] U.S. Cl. ................................ 29/149.5 R; 29/413; 29/149.5 C; 225/2
[58] Field of Search ................... 29/149.5 C, 149.5 S, 29/149.5 DP, 148.4 R, 148.4 (U.S. only), 412, 413, 414, 149.5 R

[56] References Cited

U.S. PATENT DOCUMENTS 1,209,250 12/1916 Bellanger .............................. 29/413
2,650,418 9/1953 Matheny et al. ................. 29/414 X
3,546,762 12/1970 Martin ............................... 29/148.4

FOREIGN PATENT DOCUMENTS 2723928 3/1978 Fed. Rep. of Germany .
1564642 4/1980 United Kingdom .
2064387A 6/1981 United Kingdom .................. 225/2

*Primary Examiner*—Francis S. Husar
*Assistant Examiner*—V. K. Rising
*Attorney, Agent, or Firm*—Daniel M. Rosen

[57] ABSTRACT

The present invention is a method for the manufacture of bearing rings ruptured along an arrow-shaped partition line for antifriction bearings or similar devices. According to the invention a radial bore is introduced through the middle of the ring transversely of the bearing axis, and in the opposite end faces are introduced V-shaped notches which are displaced in relation to the radial bore in a circumferential direction. The bearing ring is supported on one end and ruptured first on that end by a force directed against the opposite end. The ring is turned over and again ruptured similarly until an arrow-shaped partition line extends from the radial bore to the notches.

10 Claims, 2 Drawing Figures

METHOD OF MANUFACTURING BEARING RINGS RUPTURED ALONG AN ARROW-SHAPED PARTITION LINE

BACKGROUND OF THE INVENTION

The present invention is in the field of manufacturing bearing rings by fracturing the wall of the ring to form separate parts. For certain bearing locations, ordinary antifriction bearings may not be used, in spite of their advantages, because these bearing locations are of difficult access and the undivided bearing rings may not be placed upon the shaft or mounted into the housing.

It is already known to use antifriction bearings with divided bearing rings in such cases. In so doing, either the bearing rings are manufactured and processed from the beginning as divided rings, or the bearing rings are processed to the finished state as closed rings and are then divided by means of rupturing.

In known procedures for manufacturing divided antifriction-bearing rings by means of splitting or fracturing, the partition line is generally arranged so as to run parallel to the axis of the bearing. This has a disadvantage that the two ring parts must be prevented by special means from shifting in relation to one another in an axial direction, when mounted.

This disadvantage may be avoided by shaping the partition line in the form of an arrow, whereby the parts that engage one another are mutually fixed in an axial direction, in a positive manner. A procedure for manufacturing such arrow-shaped partition lines is already known, wherein the bearing ring is provided with V-shaped slots on opposing front sides; each notch points with its respective apex or base towards a hole that is located in the middle of the bearing ring and is shifted in relation to the V-shaped slots in a circumferential direction. Furthermore, the front or end surfaces are provided with supporting surfaces, in a manner such that the bearing ring can be supported against forces in the direction of the partition lines. For splitting purposes, the bearing ring is placed with one of its end or front side surfaces on the support and is subjected to a wedge force directed obliquely against the opposite end surface of the bearing ring, by means of a pressure wedge or breaking device, which features a wedge angle that is greater than the slot. In this fashion, a partition line widens down to the hole. The ring is now turned and the other supporting surface is placed on the support, and the ring is split to its finished form by the wedge force that is applied (DE-OS 2 723 928).

In these known procedures considerable expense must be incurred. In addition to the slanted V-shaped slots, supporting surfaces that are also slanted must be provided. Due to the many slanted slots and supporting surfaces, the front sides of the bearing rings are shaped in an extremely irregular form, and furthermore the ratio of the axial width of the bearing ring in relation to the load-carrying surface, between the rolling elements and the bearing ring, is very large. The space that may be used for bearing capacity is thus actually extremely small. Furthermore, the pressure wedge or breaking device must be shaped in wedge form and must feature a wedge angle that is greater than the V-shaped slots.

It is the objective of the present invention to create a procedure of the type discussed above, which will be less expensive and which can function without special supporting surfaces that are machined into the front sides or ends of the bearing rings. In other words, this invention provides a procedure which yields bearing rings whose widths are at an optimum in relation to the load-carrying length. This objective is accomplished by means of the procedural steps wherein a bearing ring with a single partition line is produced, or a bearing ring divided into two separate parts is produced. The procedure according to the invention shall be described in greater detail on the basis of the preferred embodiment illustrated in the attached drawings.

DESCRIPTION OF THE DRAWINGS AND PREFERRED EMBODIMENT

Figure 2:
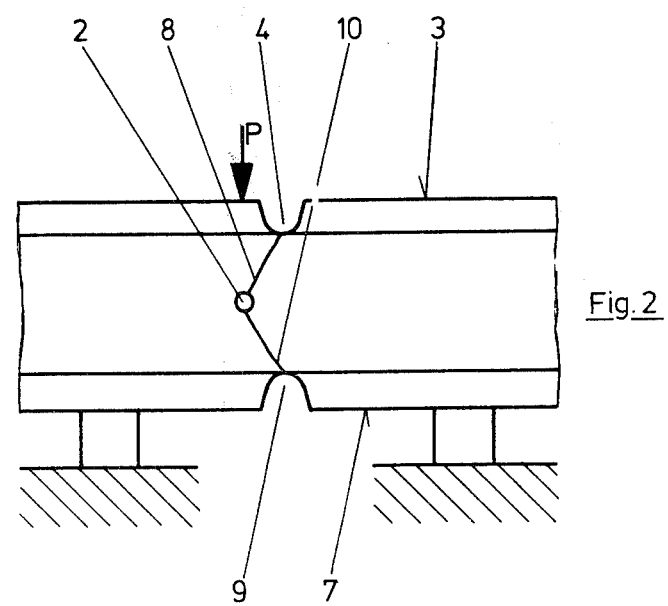

FIG. 1 is a fragmentary sectional view illustrating the first step of the new method, with the formation of a part of the partition line; and FIG. 2 is a fragmentary sectional view illustrating the second step of the new method, with the formation of the second part of the partition line for the separation of the bearing ring.

The bearing ring 1, in accordance with FIG. 1, already machined and provided with rims, is provided in the middle of the ring with a radial bore 2 and only on one end 3 is provided, in the region of the rim of bearing ring 1, with a notch 4. This bearing ring is now placed on two strips or supports 5 and 6, arranged at a distance from one another, in a manner such that notch 4, which is shifted or displaced in relation to bore 2 in a circumferential direction, comes to lie between the two strips 5 and 6. By means of an axially directed force P upon bearing ring 1 in the plane of notch 4 on the opposite end 7 of the bearing ring, end 7 being opposite the strips 5 and 6, the bearing ring 1 is divided along the partition or fracture line 8 that runs obliquely between notch 4 and bore 2. Now, another notch 9 is introduced on the opposite end 7, opposite notch 4, and the bearing ring 1 is again placed on the two strips 5 and 6 in a manner such, that notch 9 comes to lie between these two strips. By applying an axial force P in the plane of bore 2, bearing ring 1 is now completely separated along another partition line 10, between notch 9 and bore 2. In order to manufacture a bearing ring divided in two parts, the bores and notches are introduced in the bearing ring at respectively diametrically opposite positions, and the forces are applied in the region of the respective separation sections.

Certain modifications of this procedure are possible. Thus, the bearing ring may be fractured either before hardening or only after hardening. It is also possible to machine the radial bore in the middle of the ring or at another location of the bearing ring, and/or to machine the notch or notches on one front side only when processing the ring, before hardening, while the notch or notches on the other front side are only introduced after the first partial fracturing. For the purpose of introducing the notches a number of procedures may be considered, such as grinding or similar methods. In so doing, the depth of the notches may be varied according to need. Thus, in contrast to above-mentioned example, in the case of rimless bearing rings a much shallower notch may suffice to achieve fracturing along the desired line.

What is claimed is:

1. In a method for manufacturing a bearing ring fractured along an arrow-shaped partition line, the method including the steps of forming a first radial bore in the wall of the ring intermediate opposite ends of said ring, and forming notches in opposite ends, the notches being displaced in relation to the radial bore in a circumferential direction, the ring having a first of its ends supported on support means, being initially fractured on said first end from the notch down to the radial bore by means of a force directed against the support means, after which the ring is turned over and is fractured again by a force directed against the support means, the improvement comprising the steps:
  (a) forming said radial bore in the wall of the ring intermediate said opposite ends, and forming a first notch in only the first end of the bearing ring,
  (b) positioning said bearing ring with the first notch on said first end downward upon two support means arranged at a distance from one another, whereby the radial bore and the first notch are situated between the support means,
  (c) applying an axially directed force upon the bearing ring upon said second end opposite to the support means, in the plane of the first notch in the first end, until the ring fractures along a fracture line starting from the first notch and extending to the radial bore,
  (d) forming a second notch in said second end of the bearing ring opposite the first notch in said first end,
  (e) positioning the bearing ring with the second notch on the second end of the bearing ring downwards on said support means, similarly as said first end was positioned, and
  (f) applying an axially directed force upon the bearing ring on said first end toward said second end, in the plane of the radial bore, until the ring fractures along a second fracture line starting at the second notch and extending to said radial bore.

2. A method according to claim 1 comprising the further steps: forming a second radial bore in the wall of said ring diametrically opposite said first radial bore and forming a third notch in said first end diametrically opposite said first notch before applying said force on said second end, and forming a fourth notch in said second end diametrically opposite said second notch before applying said force on said first end, whereby applying said force on said second end breaks through fracture lines from said first notch to said first radial bore and from said third notch to said second radial bore respectively, and applying said force to said first end breaks through fracture lines from said second notch to said first radial bore and from said fourth notch to said second radial bore respectively.

3. A method according to claim 2 comprising the step of hardening said ring before application of any of said axial forces.

4. A method according to claim 2 comprising the step of hardening said ring after application of said axial forces.

5. A method according to claim 2 wherein each of said radial bores is formed midway intermediate said first and second ends.

6. In a method for manufacturing a bearing ring having an annular wall and opposite first and second ends, said ring being fractured along an arrow-shaped partition line in said annular wall, the improvement comprising the steps: forming a first radial bore in said annular wall intermediate said ends, and forming a first notch in said first end circumferentially displaced from said first radial bore, positioning said ring with said first end downward upon two spaced apart supports, whereby said radial bore and said first notch are situated between said supports, applying an axially directed first force upon said second end in the plane of said first notch until the ring fractures along a first fracture line extending from said first notch to said first radial bore, forming a second notch in said second end opposite said first notch in said first end, positioning said ring with said second end downward upon said spaced apart supports similarly as said first end was positioned, and applying an axially directed second force upon said first end in the plane of said radial bore until said ring fractures along a second fracture line extending from said second notch to said radial bore, said first and second fracture lines forming a first arrow-shaped partition line.

7. A method according to claim 4 comprising the further steps: forming a second radial bore in said annual wall diametrically opposite said first radial bore and forming a third notch in said first end diametrically opposite said first notch before applying said first force on said second end, whereby application of said first force fractures said ring along said first and a third fracture lines extending from said first and second radial bores to said first and third notches respectively, and forming a fourth notch in said second end diametrically opposite said second notch before applying said second force on said first end, whereby application of said second force fractures said ring along said second and a fourth fracture lines extending from said second and fourth notches to said first and second radial bores respectively, said third and fourth fracture lines forming a second arrow-shaped partition line similar to said first mentioned arrow-shaped partition line.

8. A method according to claim 6, comprising the step of hardening said ring before application of any of said axial forces.

9. A method according to claim 6 comprising the step of hardening said ring after application of said axial forces.

10. A method according to claim 6 wherein each of said radial bores is formed midway intermediate said first and second ends.

* * * * *

UNITED STATES PATENT AND TRADEMARK OFFICE
CERTIFICATE OF CORRECTION

PATENT NO. : 4,412,372
DATED : November 11, 1983
INVENTOR(S) : Armin Olschewski, et al.

It is certified that error appears in the above-identified patent and that said Letters Patent are hereby corrected as shown below:

Column 4, line 30, change "4" to --6--.

Signed and Sealed this

Twenty-sixth Day of March 1985

[SEAL]

Attest:

DONALD J. QUIGG

Attesting Officer     Acting Commissioner of Patents and Trademarks